United States Patent [19]

David

[11] Patent Number: 5,724,163
[45] Date of Patent: Mar. 3, 1998

US005724163A

[54] OPTICAL SYSTEM FOR ALTERNATIVE OR SIMULTANEOUS DIRECTION OF LIGHT ORIGINATING FROM TWO SCENES TO THE EYE OF A VIEWER

[75] Inventor: Yair David, Ramat Hasharon, Israel

[73] Assignee: Yariv Ben-Yehuda, Tel Aviv, Israel

[21] Appl. No.: 746,526

[22] Filed: Nov. 12, 1996

[51] Int. Cl.[6] .............................. G02B 5/32; G02B 3/10; G02B 27/14
[52] U.S. Cl. ........................ 359/15; 359/633; 359/721
[58] Field of Search ........................ 359/150, 16, 19, 359/565, 630, 633, 639, 227, 229, 232, 234, 721, 471, 610, 1; 351/172, 168

[56] References Cited

U.S. PATENT DOCUMENTS

| 683,012 | 9/1901 | Hill | 359/610 |
|---|---|---|---|
| 1,400,098 | 1/1921 | Perrin | 351/158 |
| 2,459,021 | 1/1949 | Frommer | 351/59 |
| 2,872,840 | 2/1959 | Stanton | 359/630 |
| 4,711,512 | 12/1987 | Upatnieks | 359/15 |
| 5,189,512 | 2/1993 | Cameron et al. | 359/610 |

FOREIGN PATENT DOCUMENTS 6-230225  8/1994  Japan ........................... 359/15

OTHER PUBLICATIONS

Jahns, J. Et al, "Two dimensional Array of Diffractive Microlenses Fabricated by Thin Film Deposition", Applied Optics, vol. 29, No. 7, 1 Mar. 1990, pp. 931–936.

Primary Examiner—Jon W. Henry
Attorney, Agent, or Firm—Mark M. Friedman

[57] ABSTRACT

An optical system for alternative or simultaneous direction of light from two scenes to the eye of a viewer comprising (a) a first lens having a first focal length; (b) a second lens having a second focal length, the first and second lenses being positioned aside one another in front of one of the eyes of the viewer, such that a single light beam from any of the scenes passes only through one of the first and second lenses; and (c) an optical arrangement for directing incident light originating from the first scene and passing through the first lens into the eye of the viewer, and at the same time, for directing incident light originating from the second scene and passing through the second lens into the eye of the viewer, the optical arrangement being positioned between the first and second lenses and the eye of the viewer.

7 Claims, 5 Drawing Sheets

OPTICAL SYSTEM FOR ALTERNATIVE OR SIMULTANEOUS DIRECTION OF LIGHT ORIGINATING FROM TWO SCENES TO THE EYE OF A VIEWER

FIELD AND BACKGROUND OF THE INVENTION

The present invention relates to an optical system for alternative or simultaneous direction of light originating from two scenes to the eye of a viewer, and more particularly, to an optical system which employs a planar optics approach for alternative or simultaneous direction of light originating from two scenes to the eye of the viewer. The system according to the invention may thus be used to provide inventive bifocal eyeglasses, using which does not require inconvenient head and eye positioning relative to the viewed scene as associated with using conventional bifocal eyeglasses.

A high percentage of the population is in need of eyeglasses due to various vision defects.

Conventional eyeglasses typically include a frame to support the glasses in a suitable position in front of the eyes of the viewer, and two lenses implemented within the frame, one for each of the eyes of the viewer. Each of the lenses is acquired a focal characteristic to compensate for its specific eye vision defect.

Thus for example, in cases of myopia, which is a vision defect of focus, resulting from too much power in the eye lens and cornea and/or too long an eyeball, the image of a distant object falls ahead of the retina and cannot be focused sharply due to extensive amount of positive focal power, a negative lens is chosen so that its image is formed at the most distant point on which the myopic eye can focus.

On the other hand, in cases of hyperopia, the reverse of myopia which results from too little power in the refracting elements of the eye and/or too short an eyeball, the image of a distant object is formed (when the eye is relaxed) behind the retina. Hyperopia is therefore compensated for by a positive lens.

Myopia and hyperopia are vision defects associated with viewing distant objects. Presibyopia, on the other hand, is an example for a vision defect associated with viewing close objects, which in many cases impairs the ability to read. Presibyopia results from the hardening of the material of the lens which typically comes with age, and leads to a limited ability to focus (accommodate) the eye with respect to close objects. Presibyopia is therefore compensated for by a positive lens which enables a user to comfortably read.

However, in many cases a single eye suffers from both a long distance vision defect such as myopia or hipermyopia limiting its landscape vision capabilities and a short distance vision defect such as presibyopia limiting its reading capabilities.

A person with such a dual eye defect is in need of either two sets of eyeglasses, the first offers corrective optics for the long distance vision defect and the other offers corrective optics for the short distance vision defect, or alternatively, a set of what is known in the art as bifocal eyeglasses which include bifocal lenses, each is in fact the combination of two lenses having given (yet different) focal lengths and optical characteristics, arranged one aside the other. Multifocal eyeglasses are also known although less frequently used due to their high price and the inability of many individuals to accommodate to their use.

Nevertheless, both these solutions suffer limitations. Using two pairs of eyeglasses, one pair for reading and the other for long distance viewing, requires changing the glasses each time a user moves his site from a close to a distant object, and wise versa. Using bi- or multifocal eyeglasses dictates different lines of site for viewing close and distant objects and limits the field of view in both cases. Typically, for reading the user is required to lower his eyes while maintaining a substantially straight forward head position. Should the close object be positioned straight ahead relative to the viewer, in order to sharply view the close object, the viewer is required to tilt his head backwards and at the same time to lower his eyes. All this leads in many cases to head and neck problems, which is the reason why many individuals prefer not to use bifocal eyeglasses.

There is thus a widely recognized need for, and it would be highly advantageous to have, an optical system for alternative or simultaneous direction of light originating from two scenes to the eye of a viewer, as such a system can be used to provide bi- or multi focal eyeglasses, using which does not require inconvenient head and eye positioning relative to the viewed scene.

SUMMARY OF THE INVENTION

According to the present invention there is provided an optical system for alternative or simultaneous direction of light originating from at least two scenes to the eye of a viewer.

According to further features in preferred embodiments of the invention described below, the system comprising (a) a first lens having a first focal length; (b) a second lens having a second focal length, the first and second lenses being positioned aside one another in front of one of the eyes of the viewer, such that a single light beam from any of the scenes passes only through one of the first and second lenses; and (c) an optical arrangement for directing incident light originating from the first scene and passing through the first lens into the eye of the viewer, and at the same time, for directing incident light originating from the second scene and passing through the second lens into the eye of the viewer, the optical arrangement being positioned between the first and second lenses and the eye of the viewer.

According to another embodiment of the invention the system comprising (a) a magnifying-collimating lens having a short focal length, for magnifying a close scene and for collimating light passing through the magnifying-collimating lens; (b) an optical arrangement for directing incident light originating from the close scene and passing through the magnifying-collimating lens into the eye of the viewer, and at the same time, for directing incident light originating from a distant scene into the eye of the viewer; and (c) a corrective lens for compensating for a long distance visual defect, the corrective lens being positioned between the optical arrangement and the eye of the viewer.

According to still further features in the described preferred embodiments the optical arrangement includes a holographic plate.

According to still further features in the described preferred embodiments the holographic plate includes at least one holographic optical element.

According to still further features in the described preferred embodiments the holographic plate includes a first input holographic optical element for permitting incident light passing through the first lens to enter the holographic plate.

According to still further features in the described preferred embodiments the holographic plate includes a first input holographic optical element for permitting incident light passing through the magnifying collimating lens to enter the holographic plate.

According to still further features in the described preferred embodiments the holographic plate further includes a second input holographic optical element for permitting incident light passing through the second lens to enter the holographic plate.

According to still further features in the described preferred embodiments the holographic plate further includes a second input holographic optical element for permitting incident light originating from the distant scene to enter the holographic plate.

According to still further features in the described preferred embodiments the holographic plate further includes an output holographic optical element for permitting light entering the holographic plate to leave the holographic plate and reach the eye of the viewer.

According to still further features in the described preferred embodiments the optical arrangement includes at least one reflective optical element.

According to still further features in the described preferred embodiments the system further comprising (d) a light blocking mechanism for, at least at a given period of time, blocking light of one of the first and second scenes from arriving onto the eye of the viewer.

According to still further features in the described preferred embodiments the optical system further comprising (d) a light blocking mechanism for, at least at a given period of time, blocking light of one of the close and distant scenes from arriving onto the eye of the viewer.

According to another embodiment of the invention provided are eyeglasses comprising two optical systems as in any of the above described embodiments.

According to another embodiment of the invention provided is a headset for three-dimensional viewing comprising two optical systems including a light blocking mechanism.

According to another embodiment of the invention provided is an optical system to be used by a viewer to acquire a three-dimensional perception of a scene presented by a first image and a second image each of the first and second images contain parallax information of the scene, the system comprising a first holographic plate and a second holographic plate, each of the first and second holographic plates including (a) a body made of a light transmitting material, the body having a first side and a second side; (b) at least one input holographic optical element formed in the first side of the body, the material and each of the input holographic optical elements are selected such that incident light entering the body and having a given direction is diffracted and undergoes substantially total internal reflection; and (c) at least one output holographic optical element formed in the second side of the body, such that light arriving at any of the output holographic optical elements exits the body in a direction substantially similar to the given direction of the incident light; wherein, the first holographic plate is for permitting substantially only light originating from the first image to arrive at one eye of the viewer, whereas the second holographic plate is for permitting substantially only light originating from the second image to arrive at the other eye of the viewer.

According to still further features in the described preferred embodiments each of the holographic optical elements further includes a light blocking mechanism to effect the permissions.

There is thus a widely recognized need for, and it would be highly advantageous to have, an optical system for alternative or simultaneous direction of light from two scenes to the eye of a viewer, as such an optical system (i) may replace bifocal eyeglasses and be used with more ease and comfort as it requires no change in head positioning, nor a change in the direction at which the eyes of the viewer are directed at, as bifocal eyeglasses require upon changing from long distance to short distance viewing; (ii) may be used for three-dimensional viewing and for (iii) bringing visual information typically outside the field of view of the viewer into that field of view, without the viewer required to change his head positioning and/or eyes direction.

Additional features, objectives and advantages of the optical systems according to the present invention are described in the following.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of an optical system for alternative or simultaneous direction of light from at least two scenes to the eye of a viewer, which can be used to provide a viewer with the image of the two or more scenes at different or single time periods. Specifically, the present invention can be used to provide bifocal eyeglasses, using which does not require inconvenient head and eye positioning relative to a viewed scene.

Figure 1:
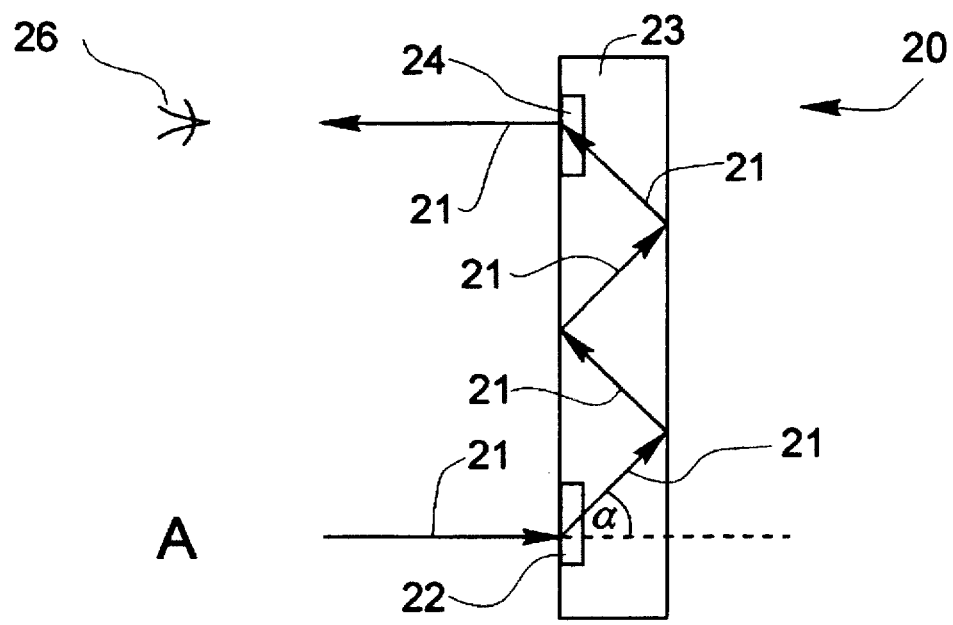
FIG. 1 is a cross section view of a prior art holographic plate.
Figure 2:
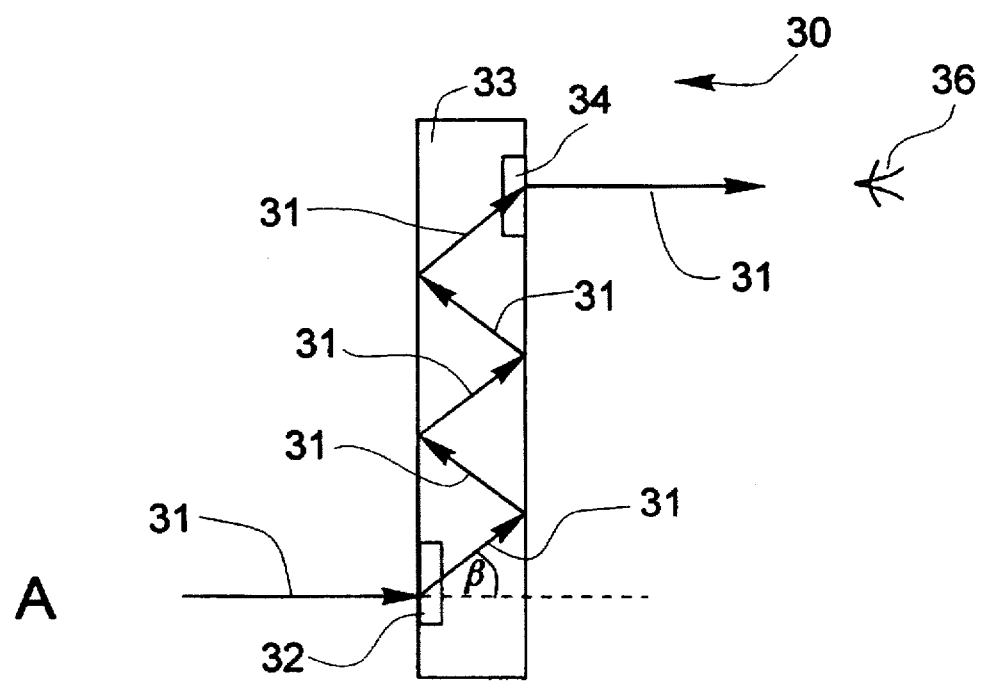
FIG. 2 is a cross section view of another prior art holographic plate which is implemented in various embodiments according to the present invention.

For purposes of better understanding the present invention, as illustrated in FIGS. 3–8 of the drawings, reference is first made to the construction and operation of conventional (i.e., prior art) holographic plates as illustrated in FIGS. 1–2.

Referring now to the drawings, FIG. 1 illustrates a prior art holographic plate, referred to hereinbelow as plate 20. Plate 20 includes a body 23 made of a light transmitting material such as but not limited to glass, plastic, etc., and further includes an input 22 and output 24 holographic optical elements (also known in the art as diffractive optical elements). The angle α in which incident light (a representative beam of which is indicated by arrows 21) is diffracted passing through input holographic optical element 22 and the material of which plate 20 is made of are selected such that light entering plate 20 undergoes a substantially total internal reflection (as indicated by arrows 21) until impinges on output holographic optical element 24, through which the light leaves (exits) plate 20. Thus, using plate 20, a scene A, light from which arrives at input holographic optical element 22, may be viewed by the eye 26 of a viewer via output holographic optical element 24.

However, a characteristic of prior art holographic plate 20 of FIG. 1, is that the light entering holographic plate 20 is in a direction substantially opposite with respect to the light leaving the plate, or in other words, the scene and the viewer have to be located in the same relation with respect to the plate, as shown in FIG. 1.

As is described in greater detail below, the prior art configuration of FIG. 1, wherein the scene and the viewer are both positioned in the same orientation with relation to the holographic plate is in many cases limiting for the various embodiments of the present invention.

With reference now to FIG. 2, presented is another prior art holographic plate 30 which is implemented in various embodiments of the present invention. Holographic plate 30 is similar to the prior art holographic plate 20 of FIG. 1, yet has a crucial distinction. While using plate 20 of FIG. 1, as described hereinabove, both the viewer and the scene to be viewed should be positioned in a similar orientation with respect to the plate. In sharp contrast, as shown in FIG. 2, while using plate 30, the viewer must take a position opposite to the position of the scene to be viewed in order to view that scene.

Thus, similar to plate 20 of FIG. 1, plate 30 of FIG. 2, includes a body 33 made of a light transmitting material such as but not limited to glass, plastic, etc., and further includes an input 32 and output 34 holographic optical elements. The angle β in which incident light (a representative beam of which is indicated by arrows 31) is diffracted passing through input holographic optical element 32 and the material of which plate 30 is made of are selected such that light entering plate 30 undergoes a substantially total internal reflection (as indicated by arrows 31) until impinges on output holographic optical element 34, through which the light leaves plate 30.

When the phrase 'substantially total internal reflection ' is used herein in this document and especially in the claims section below it refers to a total reflection with the limitation that in some cases due to impurities, defective polishing, etc., some of the light is not reflected but escapes from the plate. These phenomena are well known in the art. In fact a true total internal reflection (i.e., 100% of the light being reflected) is theoretical. However, loss of up to few percents (e.g., less than 10%, preferably less than 5%, more preferably less than 1%, most preferably less that 0.1%, or less) of the light is tolerated and is included under the definition of 'substantially total internal reflection ', as used herein. Furthermore, as well known in the art, the amount of internal reflection (e.g., at different locations) can also be controlled electrically. Such electrically controlled holographic plates fall within the definition of a holographic plate as this term used herein.

Nevertheless, in contrast to plate 20 of FIG. 1, holographic optical elements 32 and 34 of plate 30 are positioned on opposite sides of the plate. Therefore when using plate 30, a scene A taking place on one side of plate 30, light from which arrives at input holographic optical element 32, may be viewed by the eye 36 of a viewer located on the other side of plate 30, via output holographic optical element 34.

It should be noted that although plates 20 and 30 are presented as having a planar configuration, it is well known in the art that curved configurations are also permissible, provided that the curvature is selected such that the internal reflection as described above is not hampered.

Thus in the broad sense, holographic plate 30 includes (a) a body made of a light transmitting material, the body having a first side and a second side; (b) at least one input holographic optical element formed in the first side of the body, the material and each of the input holographic optical elements are selected such that incident light entering the body and having a given direction is diffracted and undergoes substantially total internal reflection; and (c) at least one output holographic optical element formed in the second side of the body, such that light arriving at any of the output holographic optical elements exits the body in a direction substantially similar to the given direction of the incident fight, e.g., as shown in FIG. 2. Substantially similar direction as used herein means entry via one side of the plate and exit via the other side.

Additional examples of holographic plates are found for example in A. A. Friesem and Y. Amitai (1996) in "Trends in Optics". A Consortini, Ed. Academic press, N.Y. pp. 125–144, which is incorporated by reference as if fully set forth herein. Specifically, various embodiments of holographic plates described in the above cited reference are herein incorporated by reference.

Figure 3A:
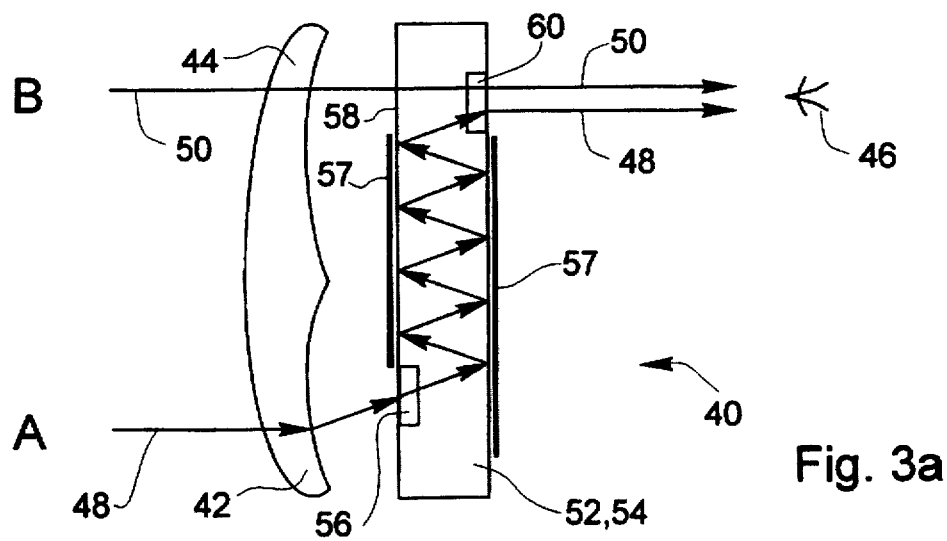
FIGS. 3a–c are cross section views of three embodiments of an optical system according to the present invention.
Figure 3B:
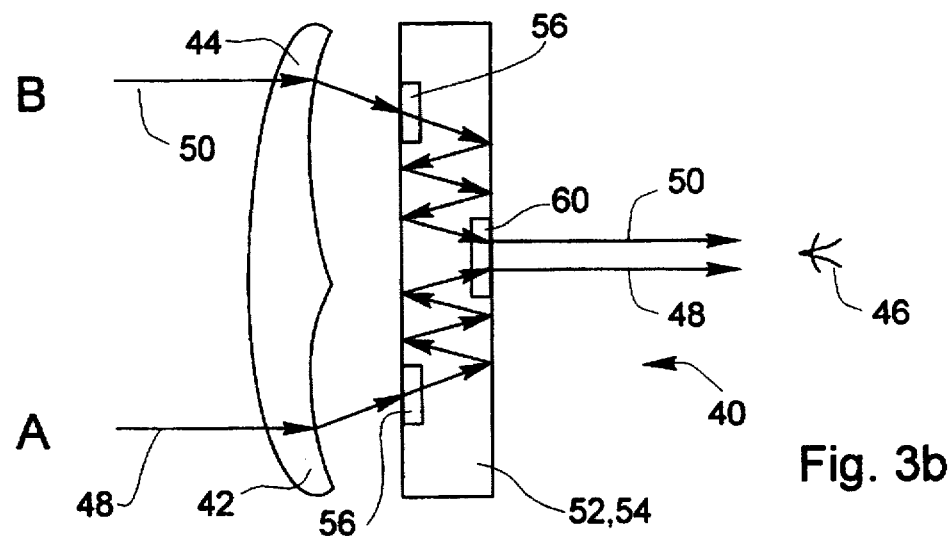
Figure 3C:
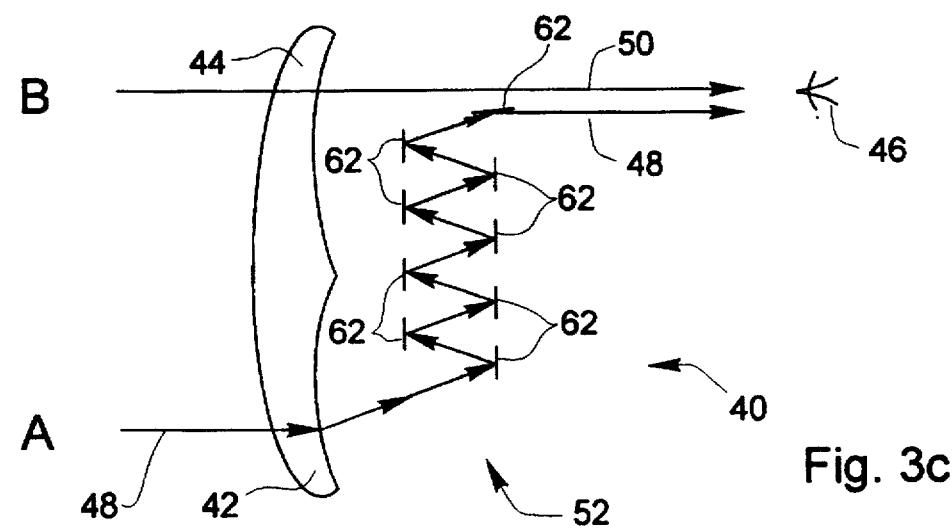

With reference now to FIGS. 3a–c, presented are three optional embodiments of an optical system according to the present invention, referred to hereinbelow as optical system 40. Optical system 40 can be used by a viewer to alternatively or simultaneously view at least a first scene A and a second scene B.

The term 'scene ' as used in this document and especially in the claims section below refers to any site visible to the human eye, e.g., moving and motionless objects, displays, images, etc. Furthermore, two scenes such as A and B, as used herein, refer both to two independent scenes, to overlapping scenes and even to a single scene viewed from two slightly different angles. Thus when the phrase "at least two scenes" is used herein it refers to at least two scenes as this term is defined hereinabove.

System 40 includes a first lens 42 characterized by a first focal length, and a second lens 44 characterized by a second focal length. First 42 and second 44 lenses are positioned aside one another in front of one of the eyes of the viewer (indicated by 46), such that a single light beam (as indicated for example by arrows 48 or 50) passes only through one of the first 42 and second 44 lenses.

It should be noted that lenses 42 and 44 are shown in FIGS. 3a–c and in FIGS. to follow as components of a bifocal lens. Nevertheless, it will be appreciated by one ordinarily skilled in the art that any two conventional lenses, i.e., not fused into a bifocal lens, are within the scope of the present invention and that there is no intention to limit the scope of the present invention to bifocal configurations as this term is used in the art of ophthalmology. It should be further noted that when the term 'aside' is used herein in this document and especially in the claims section below it refers to any configuration in which lenses 42 and 44 are close to one another. Thus, when used by a viewer, lenses 42 and 44 may be one below (or above) the other, as is exemplified in FIGS. 3a–c, they alternatively may be arranged horizontally side by side (not shown) or in any other close relation to one another, provided that light passes through one of the lenses would not pass through the other.

It will be further appreciated by one ordinarily skilled in the art that for many applications the focal lengths of lenses 42 and 44 is selected such that one lens, say 42, has a short focal lens and is therefore suitable to focus on close scenes, while the other lens, say 44, has a long focal lens and is therefore suitable to focus on distant scenes, as for example is the case in typical bifocal eyeglasses. However, as is detailed below, for other applications, such as for example for three-dimensional viewing of images presenting parallax information of a scene (i.e., each of the images presents the scene from a slightly to moderately different angle, typically as would have been viewed by the two eyes of a single viewer), the focal lengths of any of lenses 42 or 44 may be otherwise selected, in fact for the later purpose the focal lengths of lenses 42 and 44 may be selected equal or substantially equal.

System 40 further includes an optical arrangement 52 for directing incident light (as indicated by arrows 48) from a first scene A, which light first passes through first lens 42, to eye 46 of the viewer, and at the same time, for directing incident light (as indicated by arrows 50) from a second scene B, which light first passes through second lens 44, to eye 46 of the viewer. According to this embodiment of the invention optical arrangement 52 is positioned between first 42 and second 44 lenses and eye 46 of the viewer.

As will shortly be described, each of FIGS. 3a–c presents a somewhat different configuration of optical arrangement 52, yet the preferred configurations are presented in FIGS. 3a–b, wherein optical arrangement 52 includes a holographic plate 54 similar in operation to holographic plate 30 of FIG. 2.

Holographic plate 54 includes at least one (one in FIG. 3a, two in FIG. 3b) input holographic optical elements 56. Thus, in FIG. 3a, input holographic optical element 56 is for permitting incident light passing through lens 42 to enter holographic plate 54, whereas light passing through lens 44 enters holographic plate 54 in a direct fashion as it impinges plate 54 substantially perpendicular to its outer surface 58. In FIG. 3b, on the other hand, input holographic optical elements 56 are for permitting incident light passing through lenses 42 and 44 to enter holographic plate 54.

In both these cases, however, holographic plate 54 further includes at least one output holographic optical element 60. Output holographic optical element 60 is for permitting light entering holographic plate 54 to leave holographic plate 54 and reach eye 46 of the viewer. Preferably, in locations where holographic plate 54 is not to receive light, it is covered with an opaque cover 57, as shown in FIG. 3a.

As shown in FIG. 3c, optical arrangement 52 may alternatively include a set of reflective optical elements 62 (e.g., mirrors, prisms or a combination thereof as well known in the art of geometrical optics), for directing incident light from any one or both scenes A and B to eye 46 of the viewer. In fact, in FIG. 3c incident light originating from scene A is indeed directed by reflective optical elements 62 into eye 46 of the viewer, whereas incident light from scene B arrives eye 46 directly after passing second lens 44. Nevertheless, a similar set of reflective optical elements, in analogy to FIG. 3b, may be used additionally to direct incident light originating from scene B into eye 46 of the viewer.

Presently, any of the embodiments taking the advantages of planar optics are preferred, since manufacturing and operating planar optics, as for example exemplified in FIGS. 3a–b, as compared with non-planar (i.e., geometrical) optics, as exemplified in FIG. 3c, is much less limiting. Further details concerning planar optics and especially means of constructing holographic elements can be found in for example A. A. Friesem and Y. Amitai (1996) in "Trends in Optics". A Consortini, Ed. Academic press, N.Y. pp. 125–144 and in Jurgen Johns and Susan J. Walker (1990) Two-dimensional array Of diffractive microlenses fabricated by thin film deposition. Applied Optics 29:931–936, both are incorporated by reference as if fully set forth herein.

Figure 8:
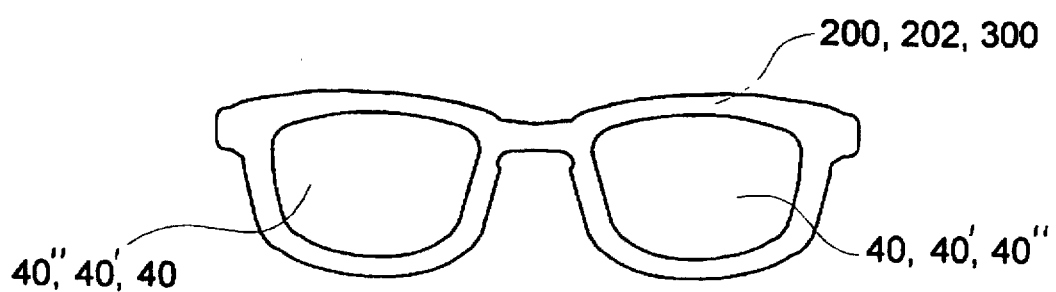
FIG. 8 is a front view of eyeglasses, headset or an optical system for three dimensional viewing, according to the present invention.

In a preferred embodiment of the invention optical system 40 is used in eyeglasses 200, shown in FIG. 8, aimed at enabling view of both close and distant scenes without relocating the head or changing the general direction at which the eyes are directed at, as is associated with using prior art bifocal eyeglasses. To this end, two systems 40, preferably of one of the configurations shown in FIGS. 3a–b, are implemented in a frame 202, preferably a prior art eyeglasses frame such that a single system 40 is placed in front of each of the eyes of the viewer.

In this case each of systems 40 includes a bifocal lens which includes, as shown in FIGS. 3a–c a lower component in the form of lens 42 having a short focal length for viewing close scene A, and an upper component in the form of lens 44 having a long focal length for viewing a distant scene B. Lenses 42 and 44 in each of systems 40 are selected corrective (compensatory) for a specific viewer according to his specific vision defects and vision limitations as is well known in the art of ophthalmology. The frame is worn by the viewer and therefore light from both scenes A and B arrives at the eyes of the viewer. Yet, when the eyes of the viewer are relaxed, i.e., the eyes of the viewer are accommodated for long distance viewing, scene A is out of focus, whereas scene B is substantially focused on the viewer's retina. On the other hand, when the eyes of the viewer are focused at viewing a close object, i.e., the eyes of the viewer are accommodated for short distance viewing, scene B is out of focus, whereas scene A is substantially focused on the viewer's retina. In both cases the viewer sees one focused and one out of focus scene. Following a training period, the brain of the viewer learns to ignore the scene which is out of focus and refers substantially only the image of the scene in focus. Thus in contrast to the mode prior art bifocal eyeglasses are used, when changing from long to short distance viewing, or vice versa, the viewer is required only to change his eyes focus, yet the viewer is free to keep constant his head position and the direction at which his eyes look.

As highly light transmitive materials having a high index of refraction are now known, the thickness of lenses used in eyeglasses and other optical devices are reduced and their curvatures flattened. Such less curved lenses are highly suitable to implement in eyeglasses according to the invention as they can be prepared with a slightly curved holographic plate adhered to their innerface (facing the eyes).

It should be noted that in a similar fashion more than two lenses can be employed in optical system 40 according to any of its configurations shown in FIGS. 3a–c and, the FIGS. following hereinbelow. In this case light originating from three or more scenes as this term is defined hereinabove may be directed simultaneously, alternatively, in pairs, etc., into the eye of the viewer.

Figure 4A:
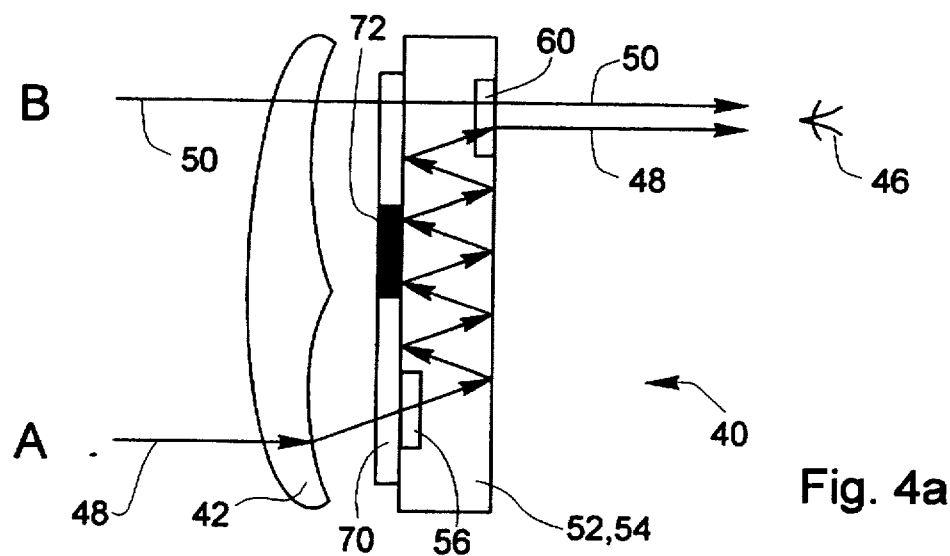
FIGS. 4a–c are cross section views of three operation modes of the optical system of FIG. 3a when equipped with a light blocking mechanism according to the invention.
Figure 4B:
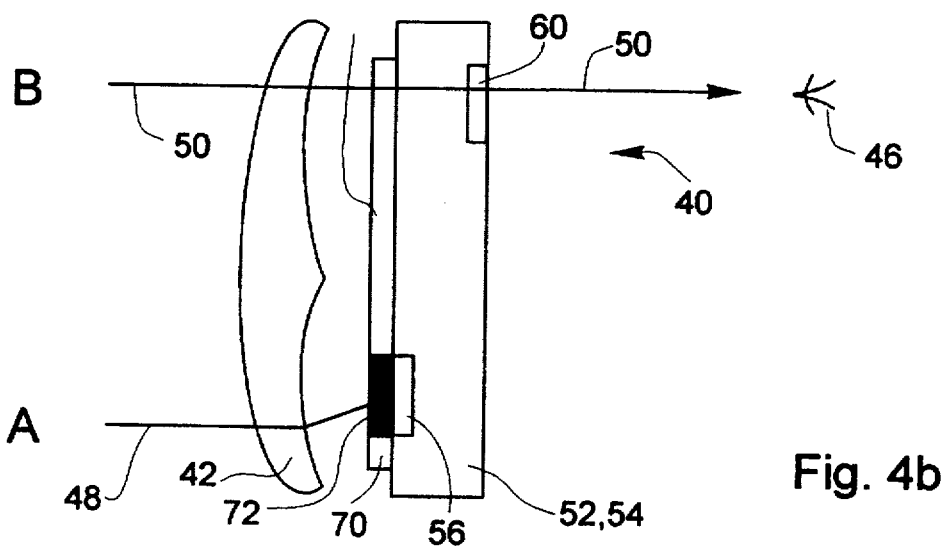
Figure 4C:
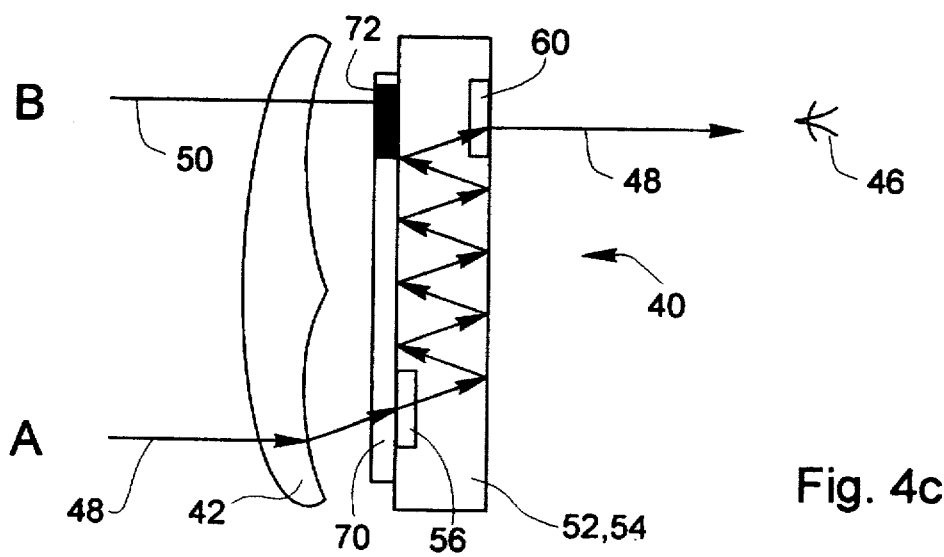

With reference now to FIGS. 4a–c. According to a preferred embodiment of the present invention, optical system 40 further includes a light blocking mechanism 70. Blocking mechanism 70 is for blocking light originating from one of the first and second scenes A and B from arriving to eye 46 of the viewer, during at least a given time period as selected by the viewer. In FIGS. 4a–c the configuration of system 40 as shown in FIG. 3a is reconstructed to further include a blocking mechanism 70. Blocking mechanism 70 includes a light blocker 72, which may preferably acquire three operation modes.

In the first operation mode, as shown in FIG. 4b, light blocker 72 is positioned such that it is blocking light originating from scene A from arriving eye 46 of the viewer.

In the second operation mode, as shown in FIG. 4c, light blocker 72 is positioned such that it is blocking light originating from scene B from arriving eye 46 of the viewer.

Whereas, in the third operation mode, as shown in FIG. 4a, light blocker 72 is positioned such that it is not blocking light originating from either scene A or B from arriving eye 46 of the viewer. Therefore, in the third mode of operation, system 40 functions essentially as described with reference to FIG. 3a above.

Thus, as shown in FIG. 4b, in the first operation mode, eye 46 of the viewer sees only scene B; as shown in FIG. 4c, in the second operation mode, eye 46 of the viewer sees only scene A; whereas in the third operation mode, as shown in FIG. 3a, eye 46 of the viewer sees both scenes A and B.

This embodiment of the optical system according to the present invention is suitable for example for viewers who cannot accommodate to ignore the out-of-focus scene as described above. Such viewers may select the scene they see simply by translating light blocker 72 along light blocking mechanism 70 from one operation mode to another.

It will be appreciated by one ordinarily skilled in the art that (i) light blocking mechanism 70 may be implemented in any of the configurations of system 40 described with reference to FIGS. 3a–c; (ii) light blocking mechanism 70 may be located at any location relative to lenses 42 and 40 and optical arrangement 52, for example light blocking mechanism 70 may be located in front of lenses 42 and 44 or between optical arrangement 52 and eye 46 of the viewer; and (iii) a light blocking mechanism 70 having any combination of only two operation modes of the three operation modes described hereinabove may be useful for some viewers or for some applications.

Figure 5:
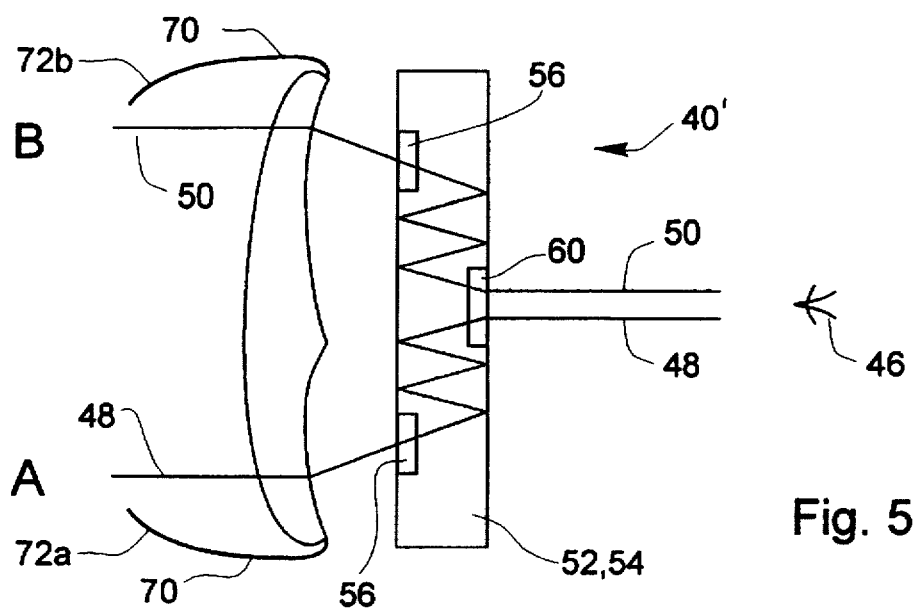
FIG. 5 is a cross section view of the optical system of FIG. 3b when equipped with a second type of light blocking mechanism, according to the invention.

With reference now to FIG. 5. In FIG. 5 the configuration of system 40 shown in FIG. 3b is reconstructed to further include another type of blocking mechanism 70. Blocking mechanism 70 of FIG. 5 includes light blockers 72a and 72b, implemented in a relation relative to lenses 42 and 44, respectively, such that upon rotation of each of blockers 72a and/or 72b, light from scenes A and/or B, respectively, is blocked from arriving into eye 46 of the viewer.

In another preferred embodiment of the invention, as shown in FIG. 8, optical system 40 is used in a headset 300 aimed for three-dimensional viewing of two images A and B of a single scene, taken from two angles, which images A and B contain parallax information of the single scene. It should be noted that in the description of the present embodiment of the invention, light originating from image A behaves as light originating from scene A of the former descriptions and that light originating from image B behaves as light originating from scene B of the former descriptions.

To this end two systems 40, preferably of one of the configurations shown in FIGS. 3a–b, are implemented within a suitable frame, preferably a prior art headset frame (not shown), such that a system 40 is placed in front of each of the eyes of the viewer. In this case, each of systems 40 includes a first component in the form of lens 42 having a given, relatively short, focal length, and a second component in the form of lens 44 having a substantially similar focal length. In this case, both lenses are preferably magnifying and collimating lenses. However, it should be noted that in this case lenses 42 and 44 are not necessarily employed as correctives (compensatives) for vision defects. The frame is worn by the viewer which accommodates blocking mechanisms 70 of both systems 40 such that one of his eyes sees substantially only light originating from image A, whereas his other eye sees substantially only light originating from image B, such that a three-dimensional perception of the scene is sensed by the viewer.

Figure 6A:
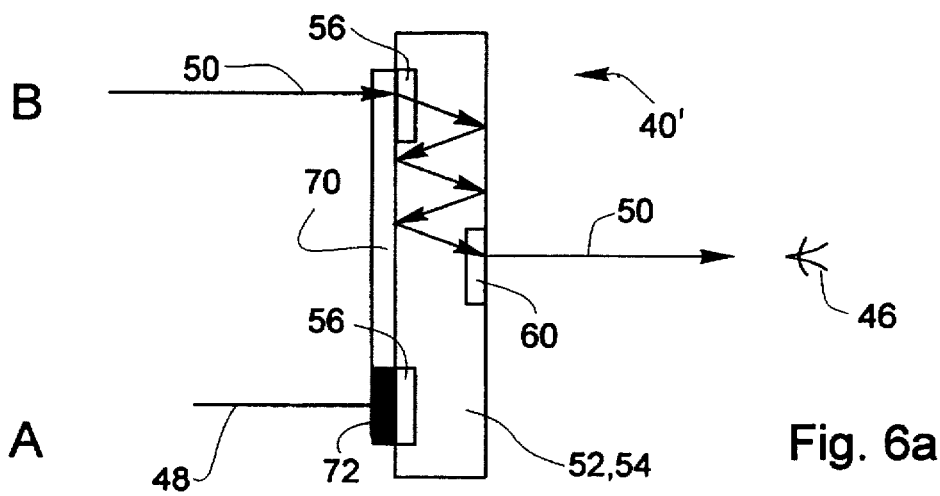
FIGS. 6a–b are cross section views of two operation modes of an optical system for three-dimensional viewing, according to the invention.
Figure 6B:
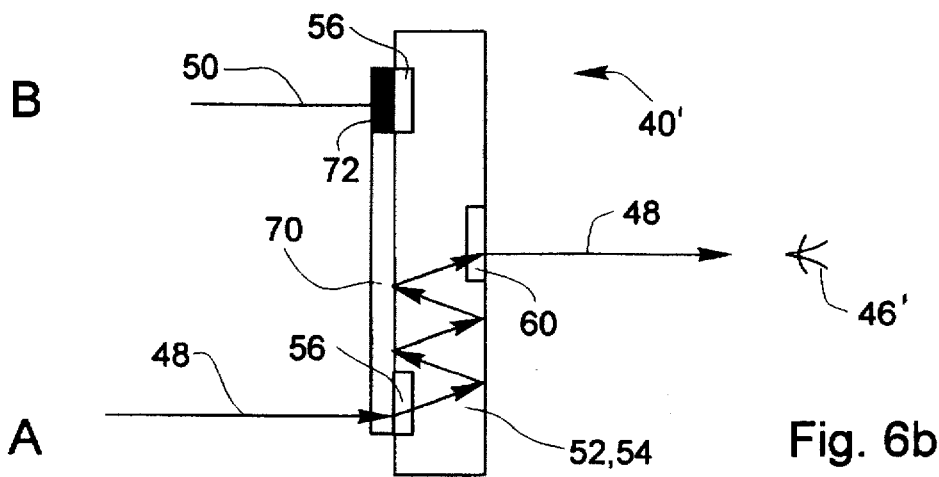

In fact, for the purpose of three-dimensional viewing, system 40 may be reduced to not include any lenses altogether. Such a reduced system, referred hereinbelow as system 40', in two operative modes, is shown in FIGS. 6a–b. System 40' includes all the components described above for the configuration of system 40 shown in FIG. 3b, yet system 40' is devoid of lenses. Optical system 40' can be used by a viewer to simultaneously view a first image A with one of his eyes, say 46, and a second image B with his other eye, say 46'. Thus system 40' includes an optical arrangement 52 for directing incident light (as indicated by arrows 48) from a first image A to eye 46' of the viewer, and at the same time, for directing incident light (as indicated by arrows 50) from a second image B to the other eye 46 of the viewer. In a preferred configurations presented in FIGS. 6a–b optical arrangement 52 includes a holographic plate 54. Holographic plate 54 preferably includes two input holographic optical elements 56 (in analogy to FIG. 3b). Input holographic optical elements 56 are for permitting incident light to enter holographic plate 54. As in this embodiment of the invention no lenses are employed, input holographic optical elements 56 are preferably selected such that they limit the field of view to their corresponding image A or B. Holographic plate 54 further includes at least one output holographic optical elements 60. Output holographic optical element 60 is for permitting light entering holographic plate 54 to leave holographic plate 54 and reach eyes 46 and 46' of the viewer. For three-dimensional viewing optical system 40' further includes a light blocking mechanism 70. Blocking mechanism 70 is for blocking light originating from first and second images A and B, respectively, from arriving to eyes 46 and 46' of the viewer, respectively, or vice versa, depending on the type of parallax information contained within images A and B. In a preferred embodiment, blocking mechanism 70 includes a light blocker 72, which may preferably acquire three operation modes as described above with respect to FIGS. 4a–c, two are shown in FIG. 6a–b.

Thus, as shown in FIG. 6b, in the first operation mode, eye 46 of the viewer sees only image B, whereas as shown in FIG. 6b, in the second operation mode, the other eye 46' of the viewer sees only image A.

Should images A and B be arranged with respect to the viewer in a predefined way, such that a left image (i.e., an image taken through a left angle with respect to the scene), say image A, is positioned to be seen by the left eye of the viewer, eye 46' in this case, and a right image (i.e., an image taken through a right angle with respect to the scene), say image B, is positioned to be seen by the right eye of the viewer, eye 46 in this case, then system 40' may be reduced not to include light blocking mechanism 70 and to include a single input holographic optical element 56, which is positioned in a first case, as shown in FIG. 6a, to enable light (as indicated by arrows 50) from image B to arrive at eye 46, and in a second case, as shown in FIG. 6b, to enable light (as indicated by arrows 48) from image B to arrive at eye 46'.

Thus according to the present invention provided is an optical system to be used by a viewer to acquire a three-dimensional perception of a scene presented by a first image and a second image each of the first and second images contain parallax information of the scene. This system includes a first and second holographic plates, each includes a body made of a light transmitting material. Each further includes at least one input holographic optical element formed in the first side of the body, the material of which the body is made of and each of the input holographic optical elements are selected such that incident light entering the body and having a given direction is diffracted and undergoes substantially total internal reflection as this term is defined hereinabove. Each of the first and second plates further includes at least one output holographic optical element formed in the second side of the body, such that light arriving at any of the output holographic optical elements exits the body in a direction substantially similar to the given direction of the incident light. The system is constructed such that the first holographic plate permits substantially only light originating from the first image to arrive at one eye of the viewer, whereas the second holographic plate permits substantially only light originating from the second image to arrive at the other eye of the viewer. To effect these permissions, each of the holographic plates preferably further includes a light blocking mechanism.

In yet another embodiment of the present invention, optical system 40 may be used to bring information out side of the field of view of the viewer into that field of view. For example, a driver of a vehicle (or a pilot of an aircraft, etc.), whose eyes are directed at the road (sky) ahead, may be equipped with a pair of systems 40 in front of his eyes to enable a simultaneous vision of both the road (sky) ahead and of the information panel and/or mirror information typically located below or above the driver's (pilot's) field of view. As for the three-dimensional viewing embodiments described hereinabove, in this case as well lenses are optional but are not essential.

Figure 7A:
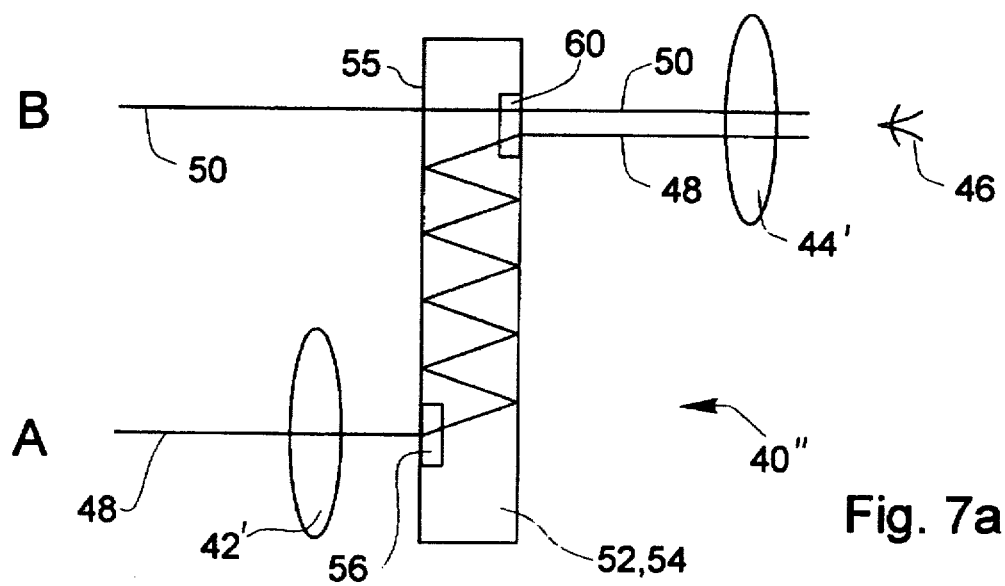
FIGS. 7a–b are cross section views of two possible configurations of an optical system for simultaneous or alternative viewing of a close and/or a distant scene, according to the invention.
Figure 7B:
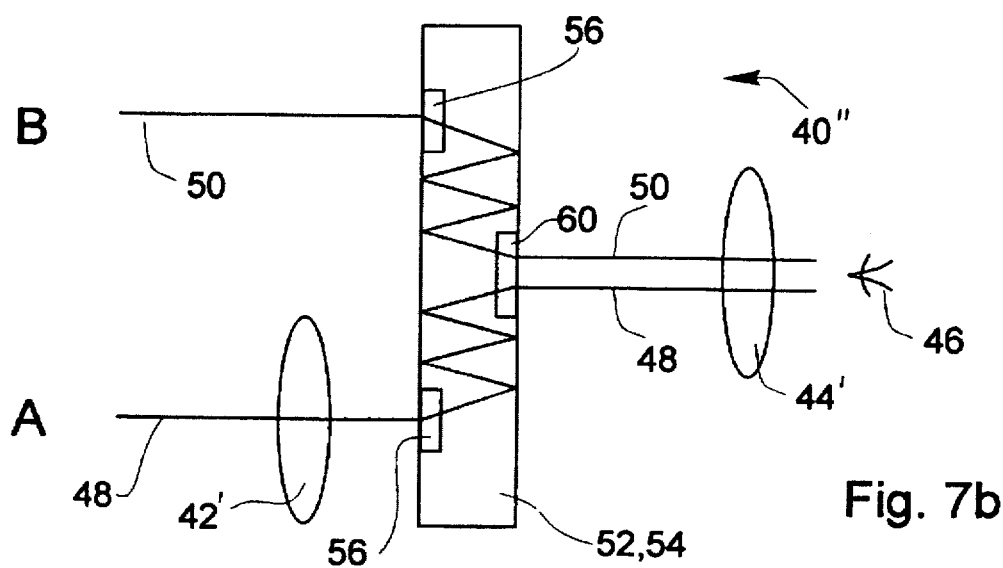

With reference now to FIGS. 7a–b. According to another preferred embodiment of the present invention provided is an optical system referred to hereinbelow as system 40". System 40" can be used to provide eyeglasses, as for example shown in FIG. 8, indicated therein by 200, aimed at enabling view of both close and distant scenes without relocating the head or changing the general direction at which the eyes are directed at, which eyeglasses are easier to manufacture as compared with glasses based on the various configurations of system 40 as each of their eyepieces includes only one (as opposed to two) costume-made lens.

FIGS. 7a–b present two optional embodiments for optical system 40" according to the present invention. Optical system 40" can be used by a viewer to alternatively or simultaneously view a close scene A and a distant scene B. System 40" includes a magnifying-collimating lens 42' which collimates light passing therethrough. Magnifying-collimating lens 42' is preferably characterized by a relatively short focal length (e.g., in the range of 25 –40 cm which is suitable for reading). Collimating-magnifying lens 42' is preferably of a conventional type which is commercially available as a basic optical element and is therefore not of a costume-made nature.

System 40" further includes an optical arrangement 52 preferably in the form of a holographic plate 54 for directing incident light (as indicated by arrows 48) from a close scene A, which light first passes through magnifying-collimating lens 42, to eye 46 of the viewer, and at the same time, for directing incident light (as indicated by arrows 50) from a distant scene B to the same eye 46 of the viewer. It is clear that optical arrangement 52 may include reflective optical elements, such as elements 62 shown in FIG. 3c, although at present this configuration is less preferred due to the advantages of planar optics as compared with classic geometrical optics.

Holographic plate 54 includes at least one (one in FIG. 7a, two in FIG. 7b) input holographic optical elements 56. Thus, in FIG. 7a, input holographic optical element 56 is for permitting incident light arriving from close scene A, first passing through lens 42', to enter holographic plate 54, whereas light originating from scene B enters holographic plate 54 in a direct fashion, as it impinges plate 54 substantially perpendicular to its outer surface 58. In FIG. 7b, on the other hand, input holographic optical elements 56 are for permitting incident light originating from both scene A and B to enter holographic plate 54.

In both these cases, however, holographic plate 54 further includes at least one output holographic optical element 60. Output holographic optical element 60 is for permitting light entering holographic plate 54 to leave holographic plate 54 and reach eye 46 of the viewer. System 40' further includes a corrective lens 44" typically having a longer focal length. Corrective lens 44" is for compensating (correcting) for long distance vision defects and is therefore adjusted to a specific eye 46 of a specific viewer. Corrective lens 44 is located between eye 46 of the viewer and output holographic optical elements 60. Light arriving at corrective lens 44" from either scene A and/or B is collimated. This is the case since light originating from close scene A is collimated by magnifying-collimating lens 42', whereas light originating from distant scene B is substantially collimated in nature.

According to the construction of system 40" as described hereinabove, only one custom-made lens (i.e., lens 44' ) is required to enable a viewer suffering from both short and long distance vision defects to comfortably view simultaneously or alternatively both close A and distant B scenes. It is clear that like system 40, system 40" may be supplemented with a light blocking mechanism (e.g., similar to light blocking mechanism 70 shown in FIGS. 4a–c) to facilitate differential viewing of close A and distant B scenes. Thus, system 40" enjoy all the advantages described above with respect to system 40, yet system 40" enjoys one additional advantage due to the fact that only a single costume-made lens (i.e., lens 44") is required, as opposed to two costume-made lenses (e.g., lenses 42 and 44 of FIGS. 3a–b and 4a–c) which are required in system 40.

While the invention has been described with respect to a limited number of embodiments, it will be appreciated that many variations, modifications and other applications of the invention may be made.

What is claimed is:

1. An optical system to be used by a viewer to view a first scene and a second scene, the system comprising:

(a) a first eyepiece lens having a first focal length;

(b) a second eyepiece lens having a second focal length, said first and second lenses being positioned aside one another in front of one of the eyes of the viewer, such that a single light beam from any of said scenes passes only through one of said first and second lenses; and (c) an optical arrangement for directing incident light originating from the first scene and passing through said first lens into said eye of the viewer, and at the same time, for directing incident light originating from the second scene and passing through said second lens into said eye of the viewer, said optical arrangement including a holagaphic plate being positioned between said first and second lenses and said eye of the viewer, said holographic plate including:
- (i) a first input holographic optical element for passing incident light passing through said first lens into said holographic plate; and
- (ii) an output holographic optical element for passing light entering said holographic plate out of said hologaphic plate to said eye of the viewer.

2. An optical system as in claim 1 wherein said holographic plate further includes a second input holographic optical element for passing incident light passing through said second lens into said holographic plate.

3. An optical system as in claim 1, further comprising:
- (d) a light blocking mechanism for, at least at a given period of time, blocking light of one of said first and second scenes from arriving onto said eye of the viewer.

4. An optical system as in claim 2, wherein said holographic plate includes a first input holographic optical element for passing incident light passing through said first lens into said holographic plate.

5. A headset for three-dimensional viewing comprising two optical systems as in claim 3.

6. An optical system to be used by a viewer to view a first scene and a second scene, the system comprising:
- (a) a first lens having a first focal length;
- (b) a second lens having a second focal length, said first and second lenses being positioned aside one another in front of one of the eyes of the viewer, such that a single light beam from any of said scenes passes only through one of said first and second lenses; and
- (c) an optical arrangement for directing incident light originating from the first scene and passing through said first lens into said eye of the viewer, and at the same time for directing incident light originating from the second scene and passing through said second lens into said eye of the viewer, said optical arrangement including a holographic plate being positioned between said first and second lenses and said eye of the viewer, said holographic plate including:
  - (i) a first input holographic optical element for passing incident light passing through said first lens into said holographic plate;
  - (ii) a second input holographic optical element for passing incident light passing through said second lens into said holographic plate; and
  - (iii) an output holographic optical element for passing light entering said holographic plate out of said holographic plate and to said eye of the viewer.

7. An optical system to be used by a viewer to view a close scene and a distant scene, the system comprising:
- (a) a magnifying-collimating lens having a short focal length, for magnifying the close scene and for collimating light passing through said magnifying-collimating lens;
- (b) an optical arrangement for directing incident light originating from the close scene and passing through said magnifying-collimating lens into an eye of the viewer, and at the same time, for directing incident light originating from the distant scene into the same eye of the viewer, said optical arrangement including a holographic plate, said holographic plate including:
  - (i) first input holographic optical element for passing incident light passing through said magnifying-collimating lens into said holographic plate.
  - (ii) second input holographic optical element for passing incident light originating from the distant scene into said holographic plate; and
  - (iii) an output holographic optical element for passing light entering said holographic plate out of said holographic plate and to said eye of the viewer; and
- (a) corrective lens for compensating for a long distance visual defect, said corrective lens being positioned between said optical arrangement and the same eye of the viewer.

* * * * *

UNITED STATES PATENT AND TRADEMARK OFFICE
CERTIFICATE OF CORRECTION

PATENT NO. : 5,724,163
DATED : March 3, 1998
INVENTOR(S) : Yair David

It is certified that error appears in the above-indentified patent and that said Letters Patent is hereby corrected as shown below:

Column 13, line 1 - replace "hologaphic" with "holographic".

Column 13, line 9 - replace "hologaphic" with "holographic".

Column 13, line 19 - delete claim 4 and in its place insert "4. Eyeglasses comprising two optical systems as in claim 1."

Signed and Sealed this

Twenty-third Day of June, 1998

Attest:

BRUCE LEHMAN

*Attesting Officer*   *Commissioner of Patents and Trademarks*